3,809,657
CATALYST SYSTEM FOR THE POLYMERIZATION OF OLEFINS

Heinz Mueller-Tamm, Ludwigshafen, Friedrich Urban, Limburgerhof, Hans Frielingsdorf and Johann Nickl, Bad Duerkheim, Guenther Schweier, Ludwigshafen, and Josef Kohnle, Gruenstadt, Germany, assignors to Badische Anilin- & Soda-Fabrik Aktiengesellschaft
No Drawing. Filed Aug. 14, 1972, Ser. No. 280,477
Int. Cl. B01j *11/84*
U.S. Cl. 252—429 C                                7 Claims

ABSTRACT OF THE DISCLOSURE

Catalyst system for the polymerization of olefins consisting of (1) a powdered inorganic carrier and, applied thereto, (2) a Zeigler-type catalyst consisting of (2.1) a component selected from the group consisting of chlorides, oxychlorides and alkoxychlorides of titanium, zirconium and vanadium and (2.2) a component selected from the group consisting of saturated metal alkyls, saturated metal alkoxyalkyls and saturated metal alkyl halides of the metals aluminum, magesium and zinc. The characterizing feature of the catalyst system of the invention is that the carrier (1) has been obtained by heating a substance of the formula $$Mg[Sn(OH)_6]$$

This catalyst system is very efficient and enables the molecular weight of the polymers to be well regulated by means of hydrogen.

---

The present invention relates to a catalyst system for the polymerization of olefins, particularly ethylene, consisting of (1) a powdered inorganic carrier having a particle diameter of from 0.1 to 2,000μ and containing chemically combined metals, and (2) a Ziegler-type catalyst applied to said carrier and consisting of (2.1) a component selected from the group consisting of chlorides, oxychlorides and alkoxychlorides of titanium, zirconium and vanadium, and (2.2) a component selected from the group consisting of saturated metal alkyls, saturated metal alkoxyalkyls and saturated metal alkyl halides of the metals aluminum, magnesium and zinc, provided that the ratio of carrier (1) to catalyst component (2.1)—based on the transition metal—is in the range 100:0.5 to 100:20 and that the atomic ratio of the transition metal in catalyst component (2.2) is in the range 100:1 to 100:10,000.

It is known that catalyst systems of this kind have certain advantages over comparable catalyst systems of other kinds; but disadvantages are (a) that the catalyst systems are not efficient to the desired extent, i.e. they are not capable of providing the desired quantity of olefin polymer per unit weight of catalyst system, and (b) that the catalyst systems do not permit satisfactory control of the molecular weight of the olefin polymers by using hydrogen during polymerization. What is desired is control over a wide range of mean molecular weight, since for some fields of application olefin polymers having a relatively high mean molecular weight are required, e.g. for the production of hollow articles by blow molding, while for other fields of applications olefin polymers having a relatively low mean molecular weight are required, e.g. for the production of shaped articles by injection molding.

It is an object of the invention to provide a catalyst system of the type defined above, which suffers from the aforementioned disadvantages either not at all or to a greatly reduced extent.

We have found that the above object is achieved if the catalyst system is based on a specific novel carrier.

The present invention thus relates to a catalyst system for the polymerization of olefins, particularly ethylene, consisting of (1) a powdered inorganic carrier having a particle diameter of from 0.1 to 2,000μ and preferably from 50 to 300μ and containing chemically combined metals and (2) a Ziegler-type catalyst applied to said carrier and consisting of (2.1) a catalyst component selected from the group consisting of chlorides, oxychlorides and alkoxychlorides (in particular $C_1$ to $C_{12}$ alkoxychlorides) of titanium, zirconium and vanadium, and (2.2) a catalyst component selected from the group consisting of saturated metal alkyls (in particular metal $C_2$ to $C_{12}$ alkyls), saturated metal alkoxyalkyls (in particular metal $C_2$ to $C_{12}$ alkoxy $C_2$ to $C_{12}$ alkyls) and saturated metal alkyl halides (in particular metal $C_2$ to $C_{12}$ alkyl chlorides) of the metals aluminum, magnesium and zinc, provided that the weight ratio of carrier (1) to catalyst component (2.1), based on the transition metal, is in the range 100:0.5 to 100:20, preferably 100:1 to 100:5, and that the atomic ratio of the transition metal in catalyst component (2.1) to the metal in catalyst component (2.2) is in the range 100:1 to 100:10,000, preferably 100:10 to 100:6,000. The catalyst system of the invention is characterized in that the carrier has been obtained by heating a substance of the formula $$Mg[Sn(OH)_6]$$

for from 1 to 50 hours and preferably from 2 to 10 hours at a temperature of from 50 to 600° C. and preferably from 200 to 450° C., heating at a relatively high temperature being effected for a relatively short period and vice versa.

The catalyst system according to the invention may be used with particular advantage when in the polymerization of olefins the latter are present in admixture with hydrogen, up to 130 moles, particularly 10 to 75 moles, of hydrogen being used per 100 moles of olefin.

This catalyst system not only enables a desirably large quantity of olefin polymer to be produced per unit weight of catalyst system but also permits satisfactory control of the molecular weight of the olefin polymers by the use of hydrogen during the polymerization process.

The following details may be given regarding the substances contained in the catalyst system of the invention:

(1) the carrier (1) is obtained by heating a compound of the specified general formula for the specified period at the specified temperature. This may be effected, for example, simply by heating the particular compound in an oven in the manner commoly used for drying inorganic substances containing water of crystallization. The desired particle size may be obtained in a simple manner, e.g. by milling—in a ball mill or other equipment—and screening.

The substance of the specified formula is readily obtainable. Suitable methods of producing it are for example the following:

(a) An aqueous solution of a Mg(II) salt, e.g. a chloride, nitrate or sulfate is combined with an aqueous solution of an equimolar amount of $K_2[Sn(OH)_6]$. It is advantageous for the molar concentration of the two solutions to be in the range from 0.1 to 4, preferably from 0.5 to 2, and for their temperature to be in the range from 20 to 98° C., preferably from 50 to 80° C.

(b) An aqueous solution of an equimolar mixture of a Mg(II) salt and $SnCl_4$ is added to an aqueous solution of an excess of $NaHCO_3$, the temperatures being from 20 to 98° C. The concentration of the $NaHCO_3$ solution should be 6 to 8 molar, preferably 6.5 to 7 molar, based on $SnCl_4$.

The substance obtained according to (a) or (b) by precipitation is filtered off and washed with water until it is substantially free from contaminants.

(2) The active portion (2) of the catalyst and the catalyst components (2.1) and (2.2) are known and may be referred to as those commonly used in the art.

(2.1) Suitable catalyst components of this type are, for example, $TiCl_4$, $ZrCl_4$, $VCl_4$, $VOCl_3$, $TiCl_3(OC_4H_9)$ and $TiCl_2(OC_2H_5)_2$. Of these, $TiCl_4$, $VCl_4$ and $VOCl_3$ are particularly suitable, $TiCl_4$ being preferred. The catalyst components (2.1) may be present as individual components or as mixtures of two or more components.

(2.2) Suitable catalyst components of this type are, for example, $Mg(C_4H_9)_2$, $Al(C_2H_5)_3$, $Al(C_3H_7)_3$, $Al(C_4H_9)_3$, $Al(i-C_4H_9)_3$, $Al(C_8H_{17})_3$, $Al(C_{12}H_{25})_3$, $Al(C_2H_5)_2Cl$, $Al(C_2H_5)_2(OC_2H_5)$ and $Zn(C_2H_5)_2$. Of these, $Al(C_2H_5)_3$, $Al(i-C_4H_9)_3$, $Al(C_2H_5)_2Cl$ and $Zn(C_2H_5)_2$ are particularly suitable, the aluminum compounds being preferred. The catalyst components (2.2) may be present as individual components or as mixtures of two or two components.

Application of the catalyst (2) to the carrier (1) may be carried out in conventional manner.

In general, first the catalyst component (2.1) is applied to the carrier (1). The intermediate product thus obtained is then contacted with the catalyst component (2.2). The intermediate product may be prepared for example by one of the following methods:

(a) The powdered carrier (1) is treated with the boiling catalyst component (2.1) or a boiling solution of catalyst component (2.1). For this purpose, the powdered carrier (1) may for example be suspended in an excess of the catalyst component (2.1) or the solution thereof and the whole is stirred for from 30 minutes to 5 hours, followed by filtration. Alternatively, the powdered carrier (1) is contacted with the boiling component (2.1) or the solution thereof in a suitable Soxhlet-type apparatus for several hours. In both cases the carrier thus treated is carefully washed with a solvent in which only the component (2.1) is soluble and then dried in vacuo or in a stream of inert gas.

(b) Coarse-grained carrier material (1), i.e. material which has not yet been powdered and has a particle size of up to 5 mm., is contacted with the catalyst component (2.1). Here again, it is advantageous to use a Soxhlet-type apparatus and to employ boiling component (2.1) or a solution thereof. When the treatment has been completed, the product is washed with an inert solvent in order to remove excess component (2.1), followed by drying. The material is then milled to a powder having a particle size of from 0.1 to 2000μ.

The powdered intermediate product obtained according to (a) or (b) is then converted into the polymerization-active catalyst system by combining it with the catalyst component (2.2). This may be done by contacting it either with the undiluted catalyst component (2.2) or with a solution of this component.

Combination of the intermediate product with the catalyst component (2.2) may be carried out either prior to polymerization outside the polymerization reactor or inside the reactor during polymerization.

The catalyst system of the invention is particularly suitable for use in the polymerization of $C_2$ to $C_8$ olefins, for example ethylene, propylene, butene, hexene and butadiene. Mixtures of olefins may also be polymerized with the aid of the present system. The system is particularly suitable for the polymerization of ethylene and propylene, and its beneficial properties are best revealed in the polymerization of ethylene.

The present invention does not relate to any particular process for the polymerization of olefins with the aid of the catalyst system of the invention. The polymerization of olefins using this system may be carried out in any conventional manner.

EXAMPLE 1

100 g. of a substance having the formula $Mg[Sn(OH)_6]$ is kept in a drying oven at 170° C. for 6 hours. The carrier (1) thus obtained is comminuted in a ball mill to a powder having a particle size of from about 10 to 400μ.

Use is made of a conventional extraction apparatus equipped with a glass bulb, an extraction chamber provided with a fritted glass disc and disposed above the bulb, a stirrer located within the extraction chamber and a reflux condenser fitted above the extraction chamber. 100 g. of powdered carrier (1) is introduced into the part of the extraction chamber above the fritted disc. 1.5 l. of $TiCl_4$ (catalyst component (2.1)) is placed in the bulb, heated to the boil and held at the boil for 4 hours, the reflux of $TiCl_4$ being controlled in such a way that the carrier remains suspended in the $TiCl_4$ throughout that period. The $TiCl_4$-laden carrier is then washed several times with n-heptane and dried in vacuo at ambient temperature. A powdered intermediate product (IP) is obtained in which the ratio by weight of carrier (1) to catalyst component (2.1); based on titanium, is about 100:3.8.

2100 parts by weight of n-pentane, 0.025 part by weight of intermediate product (IP) and 0.04 part by weight of $Al(C_2H_5)_3$—in this sequence—are placed in a stirred autoclave. The atomic ratio of Ti:Al is 100:1680. The suspension obtained is heated to 92° C. and then ethylene is forced in until a pressure of 40 atmospheres has been reached. Polymerization is carried out under these conditions for one hour; 2350 parts of polyethylene is obtained. This corresponds to a catalyst efficiency of 94,000 parts by weight of polyethylene per part by weight of intermediate product (IP) or 2,540,000 parts by weight of polyethylene per part by weight of Ti. The polyethylene obtained has an $[\eta]$ value of 14.2.

EXAMPLES 2 TO 6

The procedure described in Example 1 is followed except for the changes indicated in Table 1. Polymerization is carried out with a mixture of ethylene and hydrogen in such a way that first hydrogen is forced in up to the partial pressure indicated and then ethylene until a total pressure of 40 atmospheres has been reached. By continued forcing in of ethylene the total pressure of 40 atmospheres is kept constant for one hour. The efficiency shown in the table is indicated in parts by weight of polyethylene per part by weight of intermediate product (IP). HLMI means: melt index (MFI 190/20) [g./10 min.]; measured according to ASTM 1238-65T; MI means: melt index (MFI 190/2) [g./10 min.]; measured according to ASTM 1238-65T.

TABLE 1

| Ex. | Partial pressures of— | | Efficiency | $[\eta]$ value | HLMI | MI | HLMI/MI |
|---|---|---|---|---|---|---|---|
| | Hydrogen | Ethylene | | | | | |
| 2 | 4 | 36 | 70,300 | 3.7 | 17.88 | 0.28 | 63.9 |
| 3 | 7 | 33 | 55,000 | 2.7 | 20.50 | 0.52 | 39.4 |
| 4 | 10 | 30 | 40,900 | 2.1 | 30.60 | 1.09 | 28.1 |
| 5 | 15 | 25 | 34,700 | 1.8 | 32.1 | 1.42 | 22.6 |
| 6 | 20 | 20 | 19,800 | 1.5 | 46.0 | 5.07 | 9.1 |

It is clear from the table that, as the partial pressure of hydrogen is increased, the $[\eta]$ value and the ratio of HLMI to MI decrease. Since the said ratio is a measure of the breadth of the molecular-weight distribution, it can be seen that the molecular-weight distribution becomes narrower as the partial pressure of hydrogen is raised.

EXAMPLES 7 TO 11

300 g. of a substance having the formula $Mg[Sn(OH)_6]$ is kept in a drying oven at 400° C. for 6 hours. The carrier (1) thus obtained is comminuted in a ball mill to a powder having a particle size of from about 10 to 400μ.

150 g. of this carrier is loaded with $TiCl_4$ in the apparatus described below. A flask filled with 3500 g. of $TiCl_4$ is surmounted by a cylindrical vessel fitted with a stirrer;

a reflux condenser is fitted above the cylindrical vessel. Though a tube connecting the flask and the upper portion of the cylindrical vessel TiCl₄ (catalyst component (2.1)) is distilled into this vessel. The cylindrical vessel is provided with a siphon tube (fitted wth a stopcock) which dips into the vessel down to a level which corresponds to one third of the total height of the cylindrical vessel. This tube is also connected with the flask. The carrier is introduced into the distilled TiCl₄ with stirring. The suspension is heated at the boil for 40 minutes by means of an electric strip heater, stirring is discontinued, the solids are allowed to settle below the immersion level of the siphon, and the supernatant solution is allowed to flow back into the flask by opening the stopcock. TiCl₄ is again distilled into the cylindrical vessel and the procedure described above is repeated seven times. Then filtration is carried out using a fritted glass disc and the residue is washed with n-pentane several times and dried in vacuo. A powdered intermediate product (IP) is obtained in which the ratio by weight of carrier (1) to catalyst component (2.1), based on Ti, is about 100:2.3.

3100 parts by weight of n-pentane, 0.025 part by weight of intermediate product (IP) and such an amount of the aluminum or zinc alkyl compound indicated in Table 2 that the atomic ratio of Ti:Al or Ti:Zn is 100:1000, are introduced into a stirred autoclave. The whole is heated to 95° C. and ethylene is forced in until a pressure of 40 atmospheres has been set up. Under these conditions polymerization is carried out for 1 hour.

The results of polymerization using the various metal alkyl compounds are indicated in Table 2 (efficiency=g. of polyethylene per g. of intermediate product (IP)).

TABLE 2

| Ex. | Metal alkyl compound | Efficiency | [η] value |
|---|---|---|---|
| 7 | Al(n-C₃H₇)₃ | 61,100 | 15.5 |
| 8 | Al(i-C₄H₉)₃ | 55,600 | 17.5 |
| 9 | Al(n-C₈H₁₇)₃ | 25,500 | 18.2 |
| 10 | (C₂H₅)₂AlCl | 63,900 | 20.5 |
| 11 | Zn(C₂H₅)₂ | 22,500 | 16.5 |

EXAMPLE 12

Following the procedure of Examples 7 to 11 but using VCl₄ instead of TiCl₄, an intermediate product (IP) is prepared in which the ratio by weight of carrier (1) to catalyst component (2.1), based on vanadium, is about 100:12.

3100 parts by weight of n-pentane, 0.025 part by weight of intermediate product (IP) and 35 parts by weight of Al(C₂H₅)₃—the atomic ratio of V:Al thus being 100:1000—are introduced into a stirred autoclave. The whole is heated to 95° C., ethylene is forced in until a pressure of 40 atmospheres has been reached. Polymerization is carried out under these conditions for one hour. Polyethylene is obtained in a good yield; it has an [η] value of 26.6.

EXAMPLE 31

100 g. of the substance having the formula $$Mg[Sn(OH)_6]$$

is dried at a temperature of 400° C. for six hours and then comminuted in a ball mill to a powder having a particle size of from 10 to 400μ.

50 g. of this powdered carrier (1) is suspended in a nearly saturated solution of ZrCl₄ (catalyst component (2.1)) in benzoyl chloride and boiled under reflux for four hours while stirring. The solids are then collected on a fritted glass disk, washed with benzoyl chloride several times and dried in vacuo. In the intermediate product (IP) obtained the ratio by weight of carrier (1) to catalyst component (2.1), based on zirconium, is about 100:11.

3100 parts by weight of n-pentane, 0.025 part by weight of intermediate product (IP) and 0.030 part by weight of Al(C₂H₅)₃—the atomic ratio of Zr:Al thus being 100:15—are placed in a stirred autoclave and the suspension obtained is heated to 95° C. Ethylene is forced in until a pressure of 40 atmospheres has been reached. Polymerization is carried out under these conditions for one hour. Polyethylene is obtained in a good yield; it has an [η] value of 22.6.

We claim:
1. A catalyst system for the polymerization of olefins consisting of (1) a powdered inorganic carrier having a particle diameter of from 0.1 to 2,000μ and containing chemically combined metals and (2) a Ziegler-type catalyst applied to said carrier and consisting of (2.1) a catalyst component selected from the group consisting of chlorides, oxychlorides and alkoxychlorides of titanium, zirconium and vanadium, and (2.2 a catalyst component selected from the group consisting of saturated metal alkyls, saturated metal alkoxyalkyls and saturated metal alkyl halides of the metals aluminum, magnesium and zinc, provided that the ratio of carrier (1) to catalyst component (2.1), based on the transition metal, is in the range 100:0.5 to 100:20 by weight, and the atomic ratio of the transition metal in the catalyst component (2.1) to the metal in the catalyst component (2.2) is in the range 100:1 to 100:10,000, wherein the carrier (1) is one which has been obtained by heating a substance of the general formula:

$$Mg[Sn(OH)_6]$$

for from 1 to 50 hours at a temperature of from 50° to 600° C., heating at a relatively high temperature being effected for a relatively short period and vice versa.

2. A catalyst system as claimed in claim 1 wherein catalyst compound (2.1) is selected from the group consisting of TiCl₄, ZrCl₄, VCl₄, VOCl₃, TiCl₃(OC₄H₉), and TiCl₂(OC₂H₅)₂.

3. A catalyst system as claimed in claim 2 wherein catalyst component (2.2) is selected from the group consisting of Mg(C₄H₉)₂, Al(C₂H₅)₃, Al(C₃H₇)₃, Al(C₄H₉)₃, Al(i-C₄H₉)₃, Al(C₄H₉)₃, Al(C₈H₁₇)₃, Al(C₁₂H₂₅)₃, Al(C₂H₅)₂Cl, Al(C₂H₅)₂(OC₂H₅) and Zn(C₂H₅)₂.

4. A catalyst system as claimed in claim 1 wherein catalyst component (2.1) is selected from the group consisting of TiCl₄, VCl₄ and VOCl₃.

5. A catalyst system as claimed in claim 4 wherein catalyst component (2.2) is selected from the group consisting of Al(C₂H₅)₃, Al(i-C₄H₉)₃, Al(C₂H₅)₂Cl and Zn(C₂H₅)₂.

6. A catalyst system as claimed in claim 1 wherein catalyst component (2.2) is selected from the group consisting of Mg(C₄H₉)₂, Al(C₂H₅)₃, Al(C₃H₇)₃, Al(C₄H₉)₃, Al(i-C₄H₉)₃, Al(C₈H₁₇)₃, Al(C₁₂H₂₅)₃, Al(C₂H₅)₂Cl, Al(C₂H₅)₂(OC₂H₅) and Zn(C₂H₅)₂.

7. A catalyst system as claimed in claim 1 wherein catalyst component (2.2) is selected from the group consisting of Al(C₂H₅)₃, Al(i-C₄H₉)₃, Al(C₂H₅)₂Cl and Zn(C₂H₅)₂.

References Cited

UNITED STATES PATENTS

| 3,168,484 | 2/1965 | Engel et al. | 252—429 A |
| 3,591,656 | 7/1971 | Kroll | 252—429 C |
| 3,658,722 | 4/1972 | Delbouille et al. | 252—429 C |
| 3,676,415 | 7/1972 | Diedrich et al. | 252—429 C |
| 3,711,423 | 1/1973 | Mertzweiller et al. | 252—429 C |

PATRICK P. GARVIN, Primary Examiner

U.S. Cl. X.R.

252—430

UNITED STATES PATENT OFFICE
CERTIFICATE OF CORRECTION

Patent No. 3,809,657  Dated May 7, 1974

Inventor(s) Heinz Mueller-Tamm et al

It is certified that error appears in the above-identified patent and that said Letters Patent are hereby corrected as shown below:

First page, left hand column, eighth line, insert -- Ludwigshafen/Rhein, Germany -- after "Aktiengesellschaft".

ninth line, insert

-- 30  Foreign Application Priority Data
      August 23, 1971   Germany . . . . P 21 42 106.7 --.

Column 2, line 48, "commoly" should read -- commonly --.

Column 3, line 17, "two or two" should read -- two or more --.

Column 5, line 5, "wth" should read -- with --.

Column 5, line 59, "EXAMPLE 31" should read -- EXAMPLE 13 --.

Column 6, line 18, insert -- ) -- after "(2.2".

Column 6, line 43, delete "Al($C_4H_9$)$_3$"

Signed and sealed this 19th day of November 1974.

(SEAL)
Attest:

McCOY M. GIBSON JR.
Attesting Officer

C. MARSHALL DANN
Commissioner of Patents